United States Patent [19]
You et al.

[11] Patent Number: 5,361,380
[45] Date of Patent: Nov. 1, 1994

[54] WOOFER MODULE FOR USE IN A TELEVISION SET

[75] Inventors: Shi-Ryoung You; Byoung-Chul Ann; Nak-Seong Jeong, all of Seoul; Kyoung-Chul Oh, Inchon; Jeong-Geun Lee, Seoul, all of Rep. of Korea

[73] Assignee: Daewoo Electronics Co., Ltd., Seoul, Rep. of Korea

[21] Appl. No.: 896,387

[22] Filed: Jun. 10, 1992

[30] Foreign Application Priority Data

Jun. 19, 1991 [KR] Rep. of Korea .................... 91-9087
Mar. 18, 1992 [KR] Rep. of Korea .................... 92-4460

[51] Int. Cl.⁵ .................... H04R 5/00; H04R 25/00; H05K 5/00
[52] U.S. Cl. .................... 381/24; 381/188; 381/205; 381/159; 381/154; 181/153
[58] Field of Search .................... 381/87, 88, 96, 90, 381/188, 205, 159, 24, 154, 199; 181/148, 153, 156, 196, 182; 358/235, 254

[56] References Cited

U.S. PATENT DOCUMENTS

| | | | |
|---|---|---|---|
| 4,524,846 | 6/1985 | Whitby | 181/152 |
| 4,646,349 | 2/1987 | Puls | 381/24 |
| 4,926,487 | 5/1990 | Yoshida et al. | 381/205 |
| 5,117,463 | 5/1992 | Oyaba et al. | 381/90 |
| 5,119,429 | 6/1992 | Chatelain | 381/90 |

FOREIGN PATENT DOCUMENTS

| | | | |
|---|---|---|---|
| 0084597 | 5/1983 | Japan | 381/188 |
| 863884 | 3/1961 | United Kingdom | 358/254 |

Primary Examiner—Curtis Kuntz
Assistant Examiner—P. W. Lee
Attorney, Agent, or Firm—James D. Hall

[57] ABSTRACT

A woofer module is provided for use in a television set, which comprises a hollow enclosure and a woofer accommodated within the enclosure for reproducing a sound of low audible frequency band. The enclosure has a first sound wave passageway extending from a front side of the woofer toward a first open end and a second sound wave passageway extending from rear side of the woofer toward a second open end. The second passageway is divided into an upstream region, a middle expansion region and a downstream region. The upstream region is contiguous to the rear side of the woofer and has a cross-sectional area smaller than that of the expansion region so that an equivalent air mass can be applied to the woofer.

3 Claims, 8 Drawing Sheets

WOOFER MODULE FOR USE IN A TELEVISION SET

FIELD OF THE INVENTION

The present invention relates to a television set and is more specifically concerned with a woofer module for the television set, which has the ability to effectively reproduce the audible sound of ultra low frequency band.

DESCRIPTION OF THE PRIOR ART

Recent advance in the video technology has improved the resolution power of a television set to a great extent, which in turn requires a corresponding level of Improvement in the quality of sound. In an effort to meet this requirement, it has been a general trend in the art to equip the television set with a tweeter and a woofer, each specially designed for reproducing the high or low frequency sound. As is known, a typical tweeter poses no problem in reproducing a high frequency sound at such good quality as required in the television set including HDTV. This is, however, not the case In the woofer. The reason for this is that, while the woofer needs an "enclosure" of large volume for causing a low frequency sound to resonate therein, such enclosure cannot be furnished without making the television set bulky and complex. In other words, any increase in the enclosure volume necessarily hampers the television set from taking a compact and simple configuration.

With a view to eliminating the drawbacks mentioned above, therefore, Japanese Utility Model Laid-Open Publication No. 63-183788 discloses a television set comprising a pair of bass reflex type woofer module mounted at the opposite flank sides of the cathode ray tube. Each of the woofer units includes a woofer adapted for reproducing a low frequency sound and an enclosure or resonance box coupled to the front or rear side of the woofer for causing the sound to resonate before its discharge to the outside. However, the woofer module of the type disclosed in the Japanese publication is unsatisfactory at least in terms of the following aspects. First of all, since the expansion zone of the enclosure is immediately contiguous to the woofer per se, an equivalent air mass cannot be applied to the vibration membrane of the woofer. As used herein, an "equivalent air mass" is intended to mean a mass of air which is equivalent to the mass of the woofer membrane. Thus, the intrinsic resonance frequency of the woofer module is kept too high to reproduce the sound of ultra low frequency band with an acceptable sound pressure. A further disadvantage of the woofer module set forth above is that there have to be provided a pair of costly and bulky woofer modules at the lateral sides of the cathode ray tube. This makes the television set expensive in price and complicated in structure.

SUMMARY OF THE INVENTION

It is an object of the present invention to provide a woofer module for use in a television set which is readily mountable on the television set and which can reproduce the sound of ultra low frequency band with a high sound pressure.

Another object of the invention is to provide a television set comprising a woofer module mounted on the top thereof, the woofer module being capable of reproducing the sound of ultra low frequency band with a high sound pressure.

A further object of the invention is to provide a television set comprising a woofer module located under the cathode ray tube of the television set, the woofer module being designed to reproduce the sound of ultra low frequency band with a high sound pressure.

In accordance with one aspect of the invention, there is provided a woofer module for use in a television set, which comprises a hollow enclosure and a woofer accommodated within the enclosure for reproducing a sound of low audible frequency band, said enclosure having a first sound wave passageway extending from a front side of the woofer toward a first open end and a second sound wave passageway extending from a rear side of the woofer toward a second open end, said second passageway divided into an upstream region, a middle expansion region and a downstream region, said upstream region being contiguous to the rear side of the woofer and having a cross-sectional area smaller than that of the expansion region so that an equivalent air mass can be applied to the woofer.

In accordance with another aspect of the invention, there is provided a television set which comprises a housing with a roof panel, a cathode ray tube held within the housing and a woofer module mounted on the roof panel of the housing, said woofer module including a hollow enclosure and a woofer accommodated within the enclosure for reproducing a sound of low audible frequency band, said enclosure including a bottom wall shaped to conform to the roof panel of the housing, said enclosure having a first sound wave passageway extending from a front side of the woofer toward a first open end and a second sound wave passageway extending from a rear side of the woofer toward a second open end, said second passageway divided into an upstream region, a middle expansion region and a downstream region, said upstream region being contiguous to the rear side of the woofer and having a cross-sectional area smaller than that of the expansion region.

A further aspect of the invention lies in a television set which comprises a housing with a bottom panel, a cathode ray tube held within the housing and a woofer module positioned between the bottom panel of the housing and the cathode ray tube, said woofer module including a hollow enclosure and a woofer accommodated within the enclosure for reproducing a sound of low audible frequency band, said enclosure including a top wall shaped to conform to the cathode ray tube, said enclosure having a first sound wave passageway extending from a front side of the woofer toward a first open end and a second sound wave passageway extending from a rear side of the woofer toward a second open end, said second passageway divided into an upstream region, a middle expansion region and a downstream region, said upstream region being contiguous to the rear side of the woofer and having a cross-sectional area smaller than that of the expansion region.

BRIEF DESCRIPTION OF THE DRAWINGS

The above and other objects and features of the present invention will become apparent from the following descriptions given in conjunction with the accompanying drawings, in which.

DETAILED DESCRIPTION OF THE PREFERRED EMBODIMENTS

Figure 1:
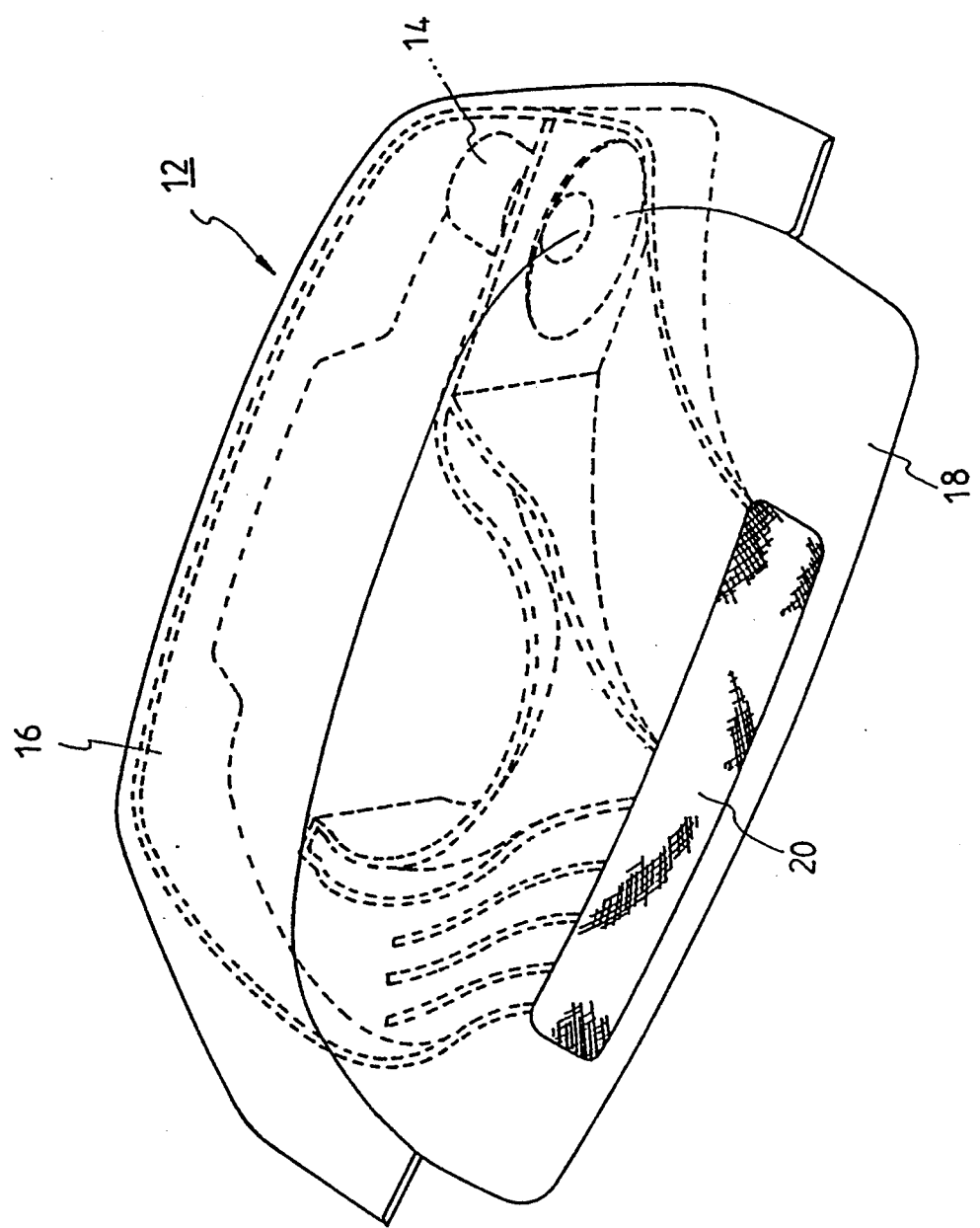
FIG. 1 is a perspective view of the inventive woofer moudule, showing in dot lines the first and the second sound wave passageways that extend respectively from the opposite sides of the woofer within the hollow enclosure.
Figure 3:
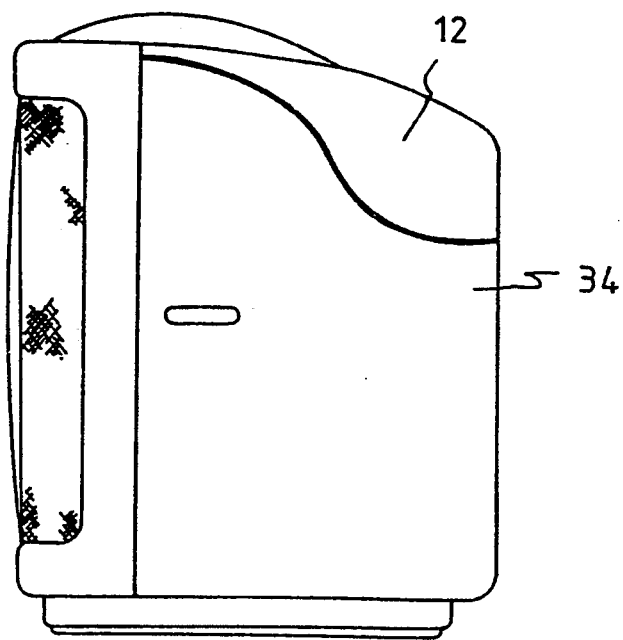
FIG. 3 is a side elevational view showing the television set and the woofer module mounted on the roof panel of the television housing.

Referring now to FIG. 1, there is shown a woofer module in accordance with one embodiment of the present invention. The woofer module is so shaped and sized that it can be mounted on the top of a television set. As shown, the woofer module comprises a hollow enclosure 12 and a woofer 14 held within the enclosure 12 for reproducing an audible sound of low frequency, e.g., less than 400 Hz. The enclosure 12 includes a top wall 16 having a frontal edge 18 along which a sound outlet port 20 extends. Preferably, the enclosure 12 is configured to fully cover the top surface of a television housing, when the woofer module is mounted in the position as shown in FIG. 3. The internal geometry of the enclosure 12 will be set forth later with reference to FIGS. 4 to 7.

Figure 2A:
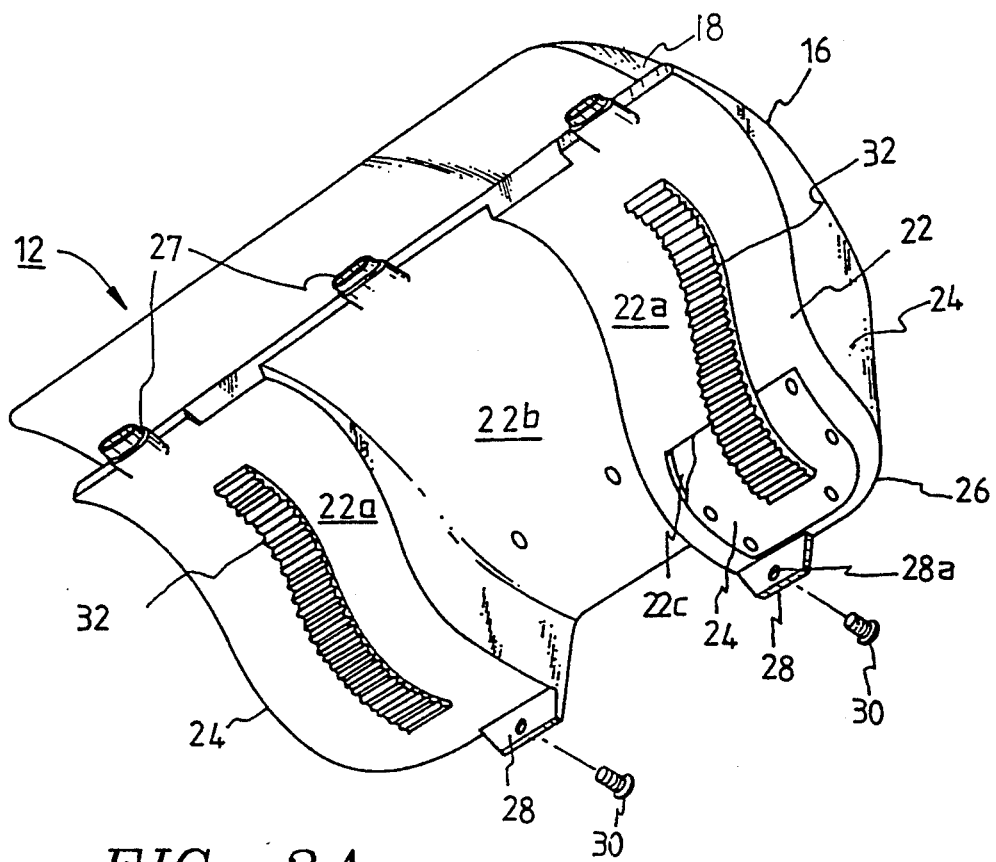
FIGS. 2(A) and (B) show respectively a preferred bottom configuration of the woofer module shown in FIG. 1 and a housing of the television set configured to have the woofer module mounted on its roof panel.

As best shown In FIG. 2(A), the enclosure 12 further includes a bottom wall 22, flank side walls 24 and a rear wall 26, each cooperating with the top wall 16 to define a closed internal space within the enclosure 12. In a preferred embodiment, the bottom wall 22 may have a pair of protruded legs 22a and a central recess 22b formed between the legs 22a. One of the legs 22a has an access opening 22c through which the woofer 14 may be installed into or taken out of the enclosure 12. The access opening 22c is normally closed off by means of a shield plate 24 so as to prevent any sound wave from leaking. Along the frontal end of the bottom wall 22, there is provided a set of positioners 27 which are equally spaced one another to aid in positioning the woofer module on the top of the television set. Each of the legs 22a is provided at its rear edge with a downwardly extending bracket 28. The bracket 28 has a hole 28a through which a screw 30 is tightened to the television housing. If desired, a friction member made of, e.g., rubber strip, may be bonded to the curved abutment surface of the leg 22a to ensure that the woofer module be kept in place without slippage when it is laid down on the top of the television housing.

Figure 2B:
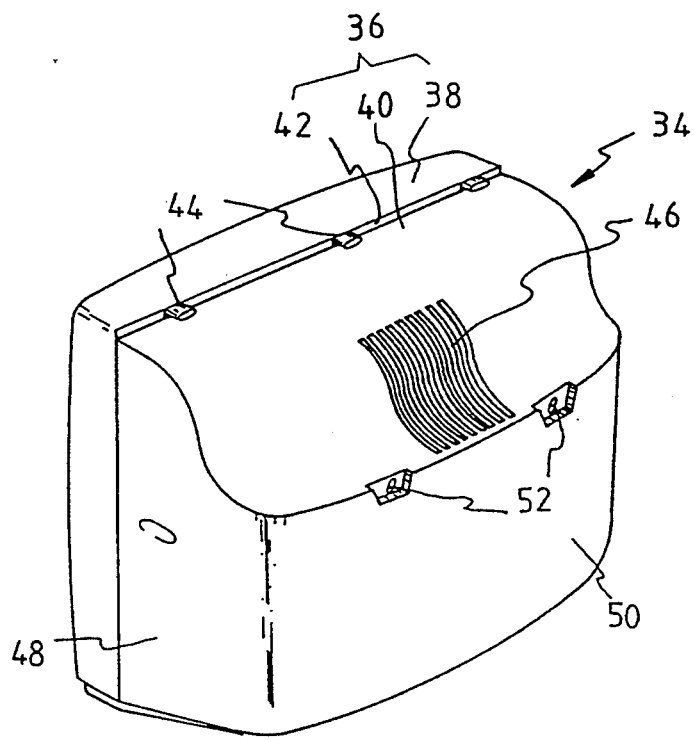

FIG. 2(B) shows, by way of example, a television set having a housing 34 designed to possess the woofer module of FIG. 2(A) on its top. As shown, the housing 34 is provided with a roof panel 36 that consists of a forward flat surface 38, a backward curved surface 40 and a vertically extending surface 42 which lies between the surfaces 38 and 40. Along the vertically extending surface 42, a plurality of lugs 44 are disposed at a substantially equal spacing, the number and the spacing of which correspond exactly to those of the positioners 27 described above with reference to FIG. 2(A). It is highly conventional that a vent hole or slot 46 is formed through the roof panel 36 or other housing walls to allow the hot air generated within the housing 34 to be ventilated therethrough. At the back panel 50 of the television housing 34, there is provided a pair of threaded holes 52 to which the screws 30 shown in FIG. 2(A) may be tightened in order to secure the woofer module on the top of the television set.

In the event that one desires to mount the woofer module on the television set of FIG. 2(B), the positioners 27 of the woofer module are first registered with the corresponding lugs 44 of the television housing 34. Then, the woofer module is forcedly pushed in the forward direction so that the lugs 44 may engage with the positioners 27. Under the condition, the woofer module will be kept on the roof panel 36 without the likelihood of slippage, because the friction member 32 comes into frictional contact with the curved surface 40 of the roof panel 36. Finally, the screws 30 are threaded into the holes 52 through the use of such a tool as screw driver. As clearly shown in FIG. 3, the television set of the type set forth above is simple in structure and smart in appearance, despite the fact that it carries the woofer module of large volume on its top. This is because the woofer module is so designed as to conform to the roof panel of the television housing. It should be understood that the central recess 22b of the bottom wall 22 shown in FIG. 2(A) enables the hot air discharged through the vent hole 46 to dissipate into the atmosphere. If the vent hole 46 is formed on the flank sides or the rear panel, there is no need to provide the central recess 22b on the bottom wall 22 of the woofer module.

Figure 4:
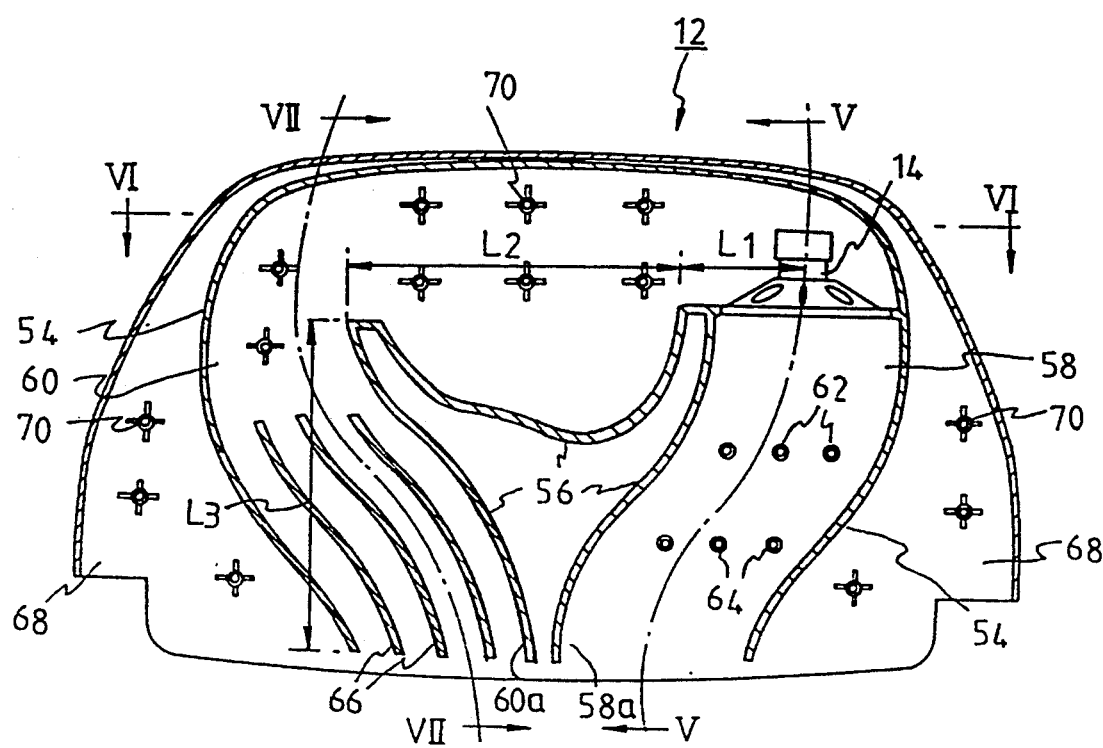
FIG. 4 is a top cross-sectional view of the woofer module shown in FIG. 1, with its top wall removed for clarity.

FIG. 4 is a top view of the woofer unit described above with reference to FIGS. 1 to 3, wherein the top wall of the enclosure 12 is removed for simplicity. As set forth hereinabove, the woofer module comprises a hollow enclosure 12 and a woofer 14 accommodated within the enclosure 12 for reproducing a sound of low audible frequency band. As used herein, the low frequency sound refers to a sound whose frequency ranges from 15 to 400 Hz, which belongs to the audible frequency band of 15 to 20,000 Hz. The enclosure 12 has a first sound wave passageway 58 and a second sound wave passageway 60 which are defined between an outer contour wall 54 and an inner contour wall 56. The first passageway 58 extends from the front side of the woofer 14 along a partial length of the contour walls 54 and 56 and then terminates at a first open end 58a, whereas the second passageway 60 extends from the rear side of the woofer 14 along the remaining length of the contour walls 54 and 56 and then terminates at a second open end 60a which neighbors with the first open end 58a. As is evident from FIGS. 5 and 7, the enclosure 12 is gradually reduced in thickness toward the frontal edge thereof. In a preferred embodiment, the second passageway 60 is divided into an upstream region L1, a middle expansion region L2 and a downstream region L3, each sequentially formed along the direction that the sound wave moves from the woofer 14.

Figure 5:
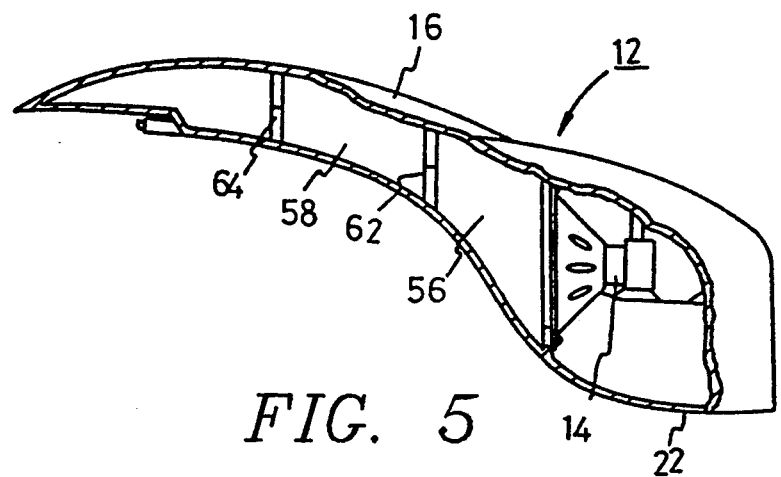
FIG. 5 is a cross-section taken along line V—V of FIG. 4.
Figure 6:
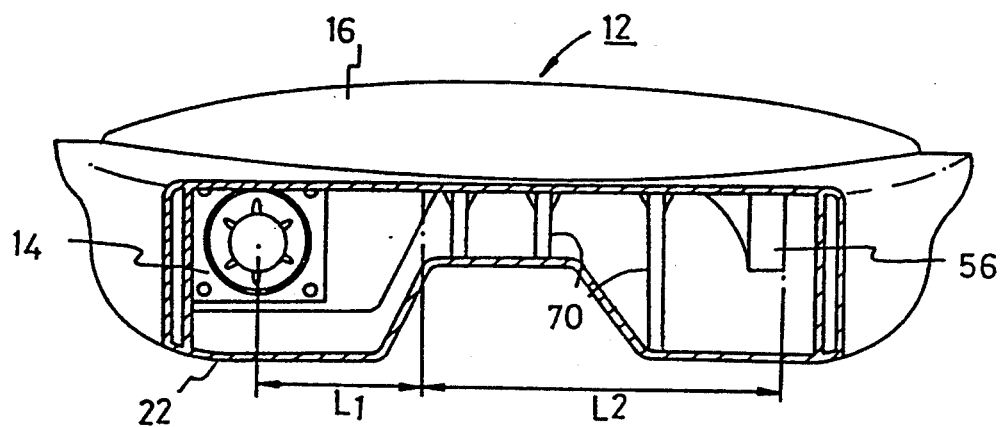
FIG. 6 is a cross-section taken along line VI—VI of FIG. 4.
Figure 7:
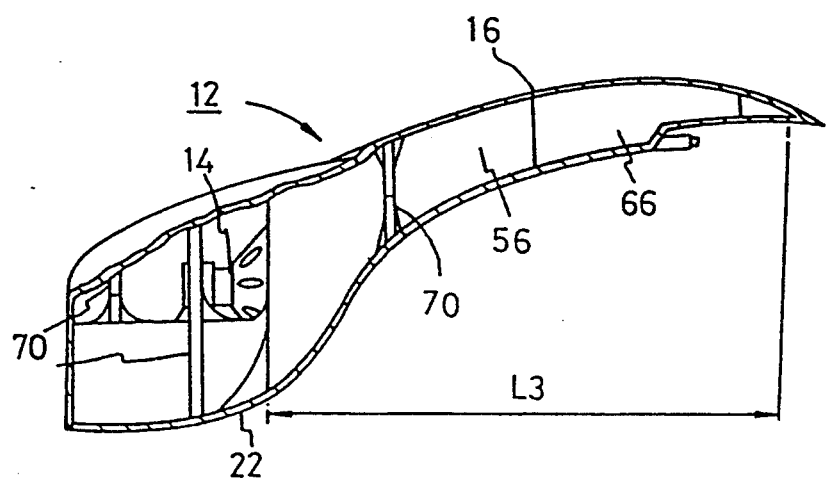
FIG. 7 is a cross-section taken along line VII-VII of FIG. 4.

FIGS. 5, 6 and 7 are cross-sectional views, each showing the first passageway 58, the upstream and the middle expansion regions L1, L2 of the second passageway 60 and the downstream region L3 of the second passageway 60. In order to apply an equivalent air mass to the vibration membrane of the woofer 14, the upstream region L1 should not only be contiguous to the rear side of the woofer 14 but also have a cross-sectional area much smaller than that of the expansion region L2. Ideally, the cross-sectional area of the upstream region L2 is substantially equal to or somewhat larger than the membrane area of the woofer 14. Moreover, the expansion region L2 may have a volume of 5,000 cm$^3$ or more, although the specific volume depends on the type and size of a particular television set. As best shown in FIG. 4, the downstream region L3 of the second passageway 60 may be arranged substantially as a mirror image of the first passageway 58.

It is of importance that the upstream region L1 be defined between the very rear side of the woofer 14 and the expansion region L2. More specifically, the state-of-art woofer modules have an expansion region or resonance box beginning immediately with the woofer 14, thus rendering it impossible to apply an equivalent air mass to the vibration membrane. Accordingly, the prior art woofer module is unable to lower the resonance frequency to such a level that the sound of ultra low frequency, e.g., less than 20 Hz may be reproduced in an audible condition. In contrast, the woofer module in accordance with the present invention can apply the equivalent air mass to the woofer membrane due mainly to the presence of the upstream region L1 between the woofer 14 and the expansion region L2, consequently lowering the frequency of the reproduced sound to a desired level. The resonance frequency in the novel woofer module is represented by the following equation:

$$f = f_o [m_s/(m_s + m_b + m_r)]^{\frac{1}{2}} \quad \text{(I)}$$

wherein $m_s$ is the mass of the vibration membrane, $m_b$ the mass of the air present in the upstream region L1 of the first passageway, $m_r$ the air mass measured in terms of the radiation reactance and $f_o$ the resonance frequency in the free space.

The air mass $m_b$ in equation(I) may be calculated on the basis of the following equation:

$$m_b = \rho\, l_b S_b \quad \text{(II)}$$

wherein $\rho$ denotes the density of air, $l_b$ the length of the upstream region L1 and $S_b$ the cross-sectional area of the upstream region L1.

Further, the radiation reactance mass of air $m_r$ is given by the equation:

$$m_r = (8/3)\rho(S_b/\pi)^{3/2} \quad \text{(III)}$$

Finally, the resonance frequency fo in the free space is expressed by the equation:

$$f_o = \tfrac{1}{2}\pi(LC)^{\frac{1}{2}} \quad \text{(IV)}$$

wherein L and C denote the reactance and the capacitance of the air, respectively.

If the woofer module employs a woofer having a vibration membrane of 4 g and the upstream region L1 is 20 cm in length and 80 cm$^2$ in cross-sectional area, equation (I) may well read:

$$f = f_o(4/6.32)^{\frac{1}{2}} = 0.80\, f_o$$

Given that the resonance frequency in the free space is 80 Hz, for example, the intrinsic resonance frequency of the woofer module will become as small as 64 Hz. This is because the air present in the upstream region L1 imparts an equivalent mass to the woofer membrane.

Figure 8B:
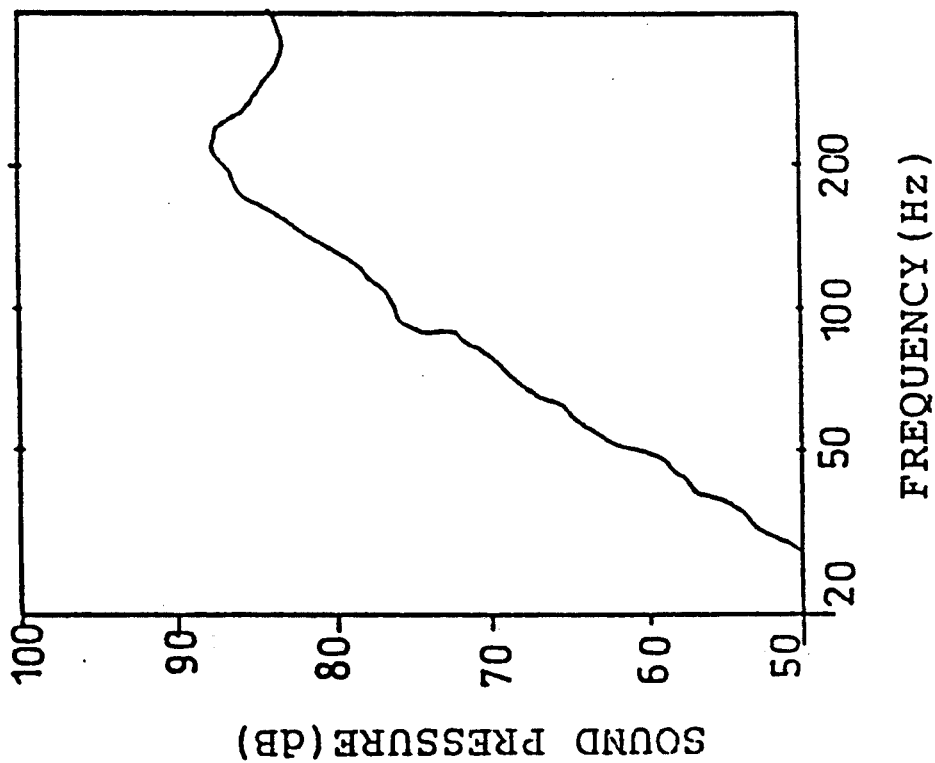
FIG. 8(A) is a sound spectrum of the woofer module made in accordance with the present invention, FIG. 8(B) illustrating a sound spectrum of the prior art woofer module.
Figure 8A:
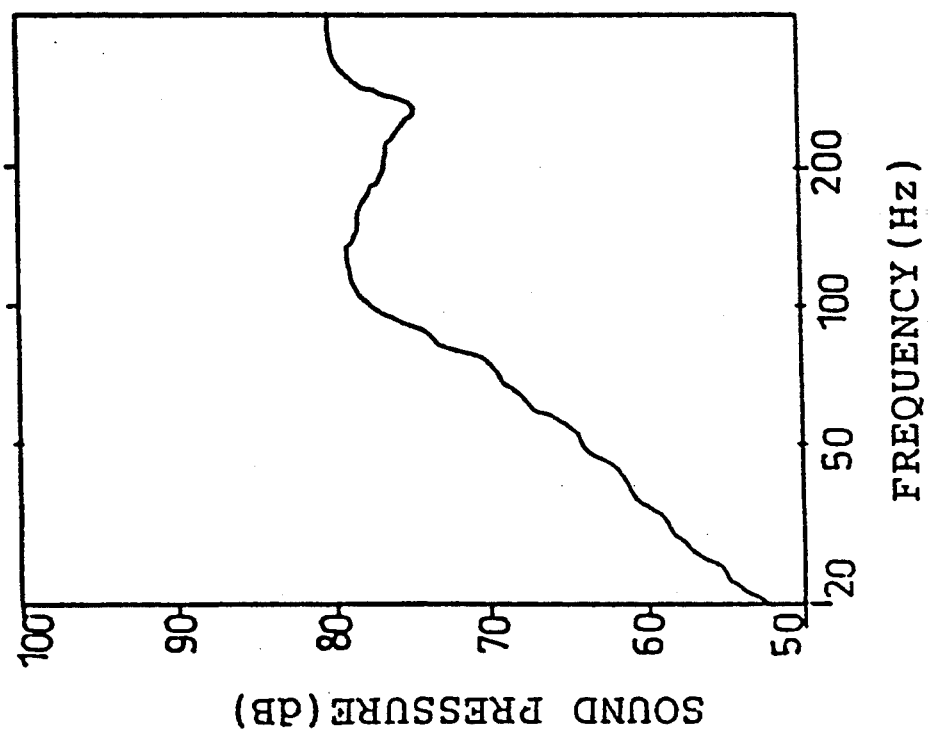

FIG. 8(A) shows a sound spectrum of the woofer module whose upstream region L1 is 20 cm in length and 80 cm$^2$ in cross-sectional area, whereas FIG. 8(B) illustrates a sound spectrum of the prior art woofer module with no such upstream region as in the present invention. A comparison of these sound spectra reveals that the woofer module embodying the present invention has the ability to reproduce even the sound of 20 Hz or less with a sound pressure much greater than that of the prior art woofer module.

Turning back to FIGS. 4 to 7, It can be seen that a number of support bars 62,64 are disposed In the first passageway 58 and further that three partition walls 66 extend along a partial length of the downstream region L3 of the second passageway 60 to define four channels therebetween. The support bars 62,64 and the partition walls 66 serve to reinforce the enclosure 12, thereby suppressing any unwanted mechanical vibration thereof. Furthermore, there are provided a plurality of poles 70 in the expansion region L2 of the second passageway 60 as well as In the marginal zone 68 of the enclosure 12. The poles 70 are intended to connect the top and the bottom walls of the enclosure 12 together such that the enclosure 12 itself may not suffer from any mechanical vibration.

Figure 9:
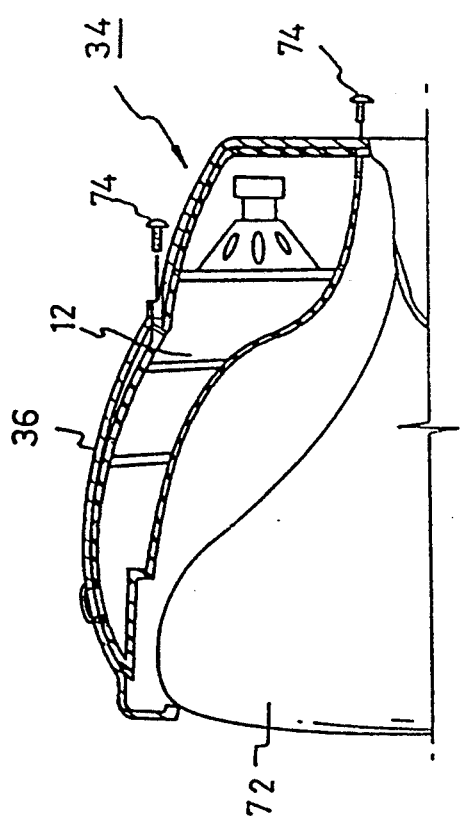
FIG. 9 shows another example of the television set having a modified woofer module positioned between the cathode ray tube and the roof panel of the housing.

FIG. 9 shows an alternative example of the television set wherein the woofer module is held in place between the cathode ray tube 72 and the roof panel 36 of the television housing 34. In this type of television set, it is necessary to make the top wall of the enclosure 12 conform to the inner surface of the roof panel 36. Any suitable securing means, e.g., screws 74, may be employed in securing the woofer module to the roof panel 36 of the television housing 34. It should be appreciated that the woofer module shown in FIG. 9 has an improved freedom of design as long as the bottom wall of the enclosure 12 is concerned.

Figure 10A:
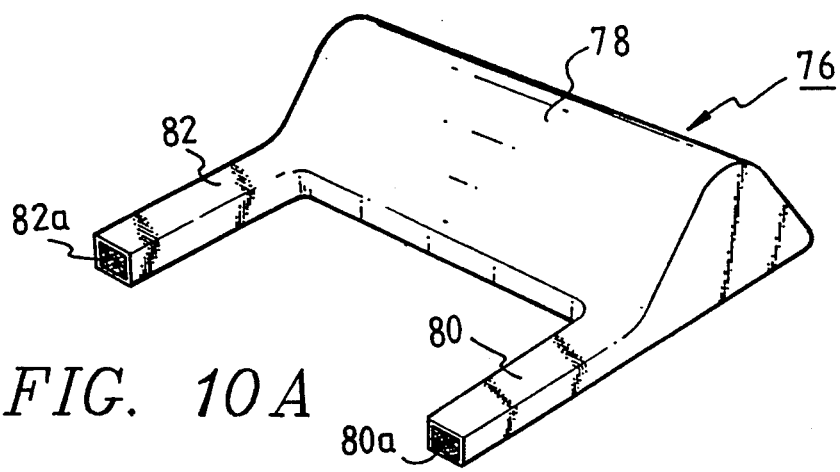
FIGS. 10(A) and (B) are perspective and cross-sectional views of the woofer module designed to be installed between the cathode ray tube and the bottom pannel of the television housing, FIG. 10(C) depicting the television set that employs the woofer module as shown in FIGS. 10(A) and (B)
Figure 10B:
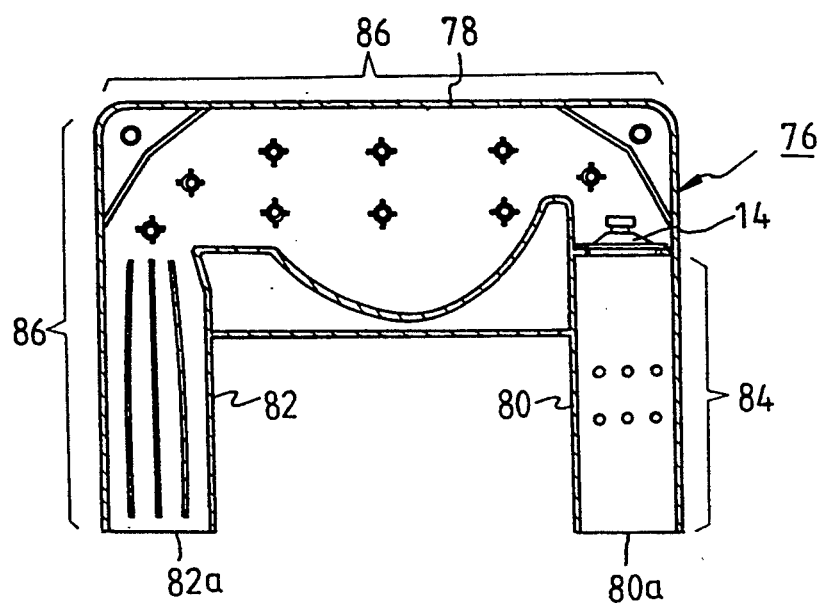

Another embodiment of the woofer module as shown in FIGS. 10(A) and (B) is designed to occupy an appropriate position beneath the cathode ray tube of the television set. As in the immediately preceding embodiment, the woofer module comprises a hollow enclosure 76 and a woofer 14 accommodated within the enclosure 76 for reproducing a sound of low frequency. The enclosure 76 includes an expanded body 78 whose top wall is inclined to conform to the funnel portion of the cathode ray tube. A pair of parallel ducts 80, 82 extend from the body 78 in the forward direction. The internal space of the enclosure 76 is divided into a first sound wave passageway 84 and a second sound wave passageway 86 about the woofer 14. As shown in FIG. 10(B), the first passageway 84 is defined within the duct 80 in the way that it begins with the front side of the woofer 14 and terminates at the first open end 80a. Likewise, the second passageway 86 is defined within both the body 78 and the duct 82 in the manner that it begins with the rear side of the woofer 14 and terminates at the second open end 82a. Each of the first and the second open ends 80a, 82a is preferably of rectangular shape and may have a width greater than its height. The second passageway 86 is subdivided into an upstream region, a middle expansion region and a downstream region, each sequentially formed along the second passageway 86 within the body 78 and the duct 82. The upstream region has a cross-sectional area much smaller than that of the expansion region so that an equivalent air mass may be applied to the vibration membrane of the woofer 14. No further description will be given to the structural and functional details of the woofer module shown in FIGS. 10(A) and (B), since they are substantially In line with those of the woofer module as previously set forth with reference to FIGS. 1 to 8.

Figure 10C:
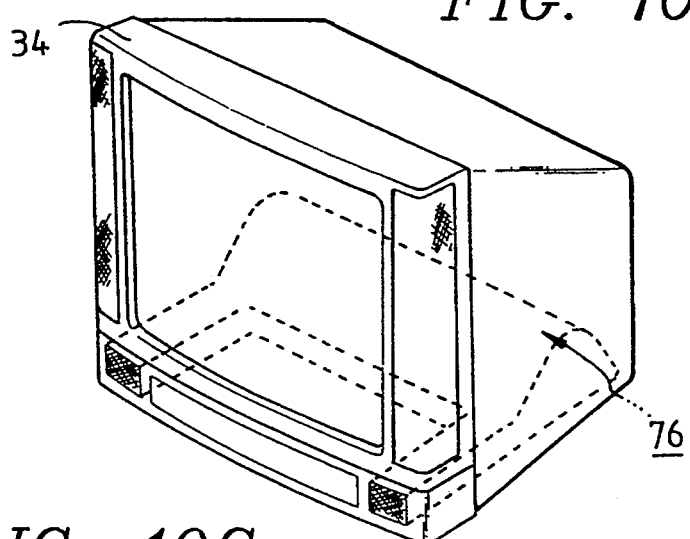

FIG. 10(C) Illustrates a television set of the type with the woofer module of FIGS. 10(A) and (B) located at a suitable position between the cathode ray tube(not shown) and the bottom panel of the television housing 34. It should be noted that the television set makes use of the waste or dead space within the housing 34 in mounting the woofer module on the television set. As a consequence, there is no need to redesign the housing 34 for the special purpose of mounting the woofer module.

Figure 11A:
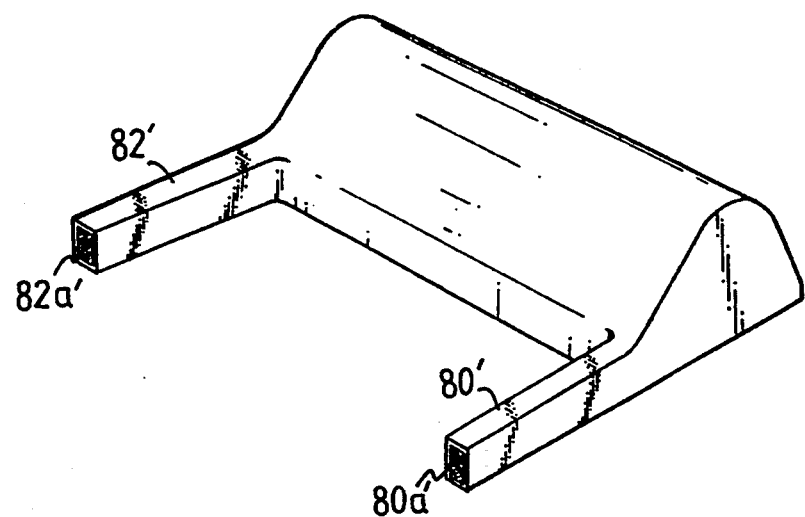
FIGS. 11(A) and (B,) show a modification of the woofer module as illustrated In FIGS. 10(A) and (B).
Figure 11B:
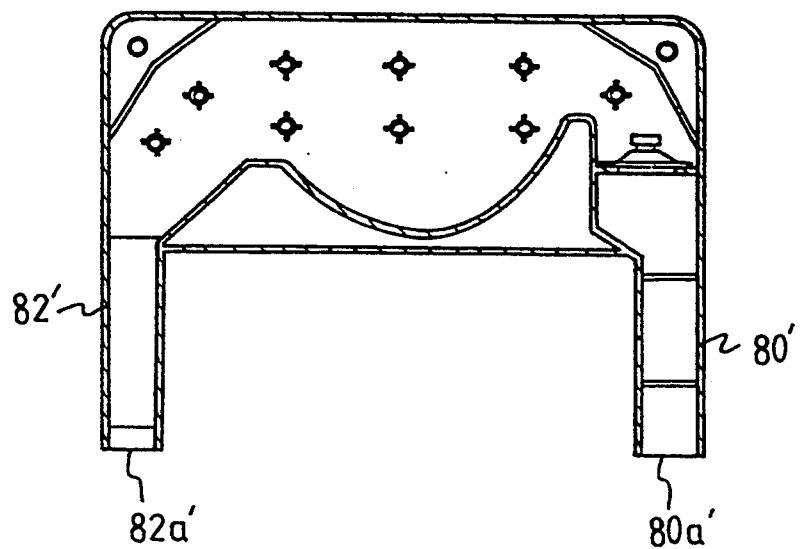

Lastly, FIGS. 11(A) and (B) show a modification of the woofer module depicted In FIGS. 10(A) and (B). The modified woofer module is structurally identical to the woofer module of FIGS. 10(A) and (B), with the exception that each of the open ends 80a', 82a' has a width smaller than its height. The reason for the narrower width is to have the open ends 80a', 82a' match, in width, with the sound outlet port of a dome speaker (not shown) normally disposed above the woofer module, thereby improving the appearance of the television set.

While the present invention has been shown and described with reference to the particular embodiments, it will be apparent to those skilled in the art that many changes and modifications may be made without departing from the spirit and scope of the invention as defined in the claims.

What is claimed is:

1. A woofer module for use in a television set, which comprises a hollow enclosure and a woofer accommodated within the enclosure for reproducing a sound of low audible frequency band, said enclosure having a first sound wave passageway extending from a front side of the woofer toward a first open end and a second sound wave passageway extending from a rear side of the woofer toward a second open end, said second passageway divided into an upstream region, a middle expansion region and a downstream region, said upstream region being contiguous to the rear side of the woofer and having a cross-sectional area smaller than that of the expansion region, said enclosure comprising a plurality of poles distributed within the second passageway for preventing the enclosure from being subjected to an unwanted mechanical vibration and one or more longitudinal partition walls extending along a partial length of said downstream region in a spaced relationship with each other.

2. The woofer module as recited in claim 1, wherein said first open end is located at a frontal edge of the enclosure and said second open end is positioned adjacent to and in a side-by-side relationship with said first open end.

3. A television set comprising a housing with a roof panel, a cathode ray tube held within the housing and a woofer module mounted on the roof panel of the housing, wherein said woofer module comprises a hollow enclosure and a woofer accommodated within the enclosure for reproducing a sound of low audible frequency band, said enclosure including a bottom wall shaped to conform to the roof panel of the housing, said enclosure having a first sound wave passageway extending from a front side of the woofer toward a first open end and a second sound wave passageway divided into an upstream region, a middle expansion region and a downstream region, said upstream region being contiguous to the rear side of the woofer and having a cross-sectional area smaller than that of the expansion region, said downstream region being smaller in its cross-sectional area and volume than the expansion region, said enclosure comprising a plurality of poles distributed within the second passageway for preventing the enclosure from being subjected to an unwanted mechanical vibration.

* * * * *